2,948,701
FINELY DIVIDED METAL SILICATE PRODUCTS

Chester L. Baker, Narberth, and John Frankle Austin, Philadelphia, Pa., assignors to Philadelphia Quartz Company, Philadelphia, Pa., a corporation of Pennsylvania No Drawing. Filed Mar. 11, 1958, Ser. No. 720,534

9 Claims. (Cl. 260—41.5)

This invention generally relates to the manufacture of finely divided metal silicate products and it comprises a process for producing a finely divided product containing a metal silicate and frequently also containing metal oxide and/or silica in finely divided form, said process comprising mixing an aqueous solution of certain sodium silicates with a water miscible, hydrophilic, organic compound as a coacervating agent and mixing in as an insolubilizing agent a metal compound capable of forming an insoluble silicate in an amount sufficient to precipitate at least a substantial part of the silica in a mixture and recovering the finely divided precipitate thereby produced.

Prior art methods

There are many industrial applications of finely divided inorganic materials and a large number of procedures have been developed for the production of such materials. Grinding is, of course, the most widely used and on the whole one of the most satisfactory methods of obtaining finely divided materials, but grinding to any high degree of fineness requires the expenditure of a large amount of power and this factor usually renders the method impractical when a fineness in the order of about 1 micron or below is desired. Various other methods have been suggested for the production of fine particles, such as chemical reactions in the vapor phase, chemical precipitating methods, subliming methods, condensations from the vapor phase, methods involving gelation, etc. Most of these methods are expensive, and others have drawbacks which render them unattractive. In spite of these unfavorable features, however, several of these auxiliary methods have been used commercially owing to the great demand for pigments, fillers, delustering agents and the like.

Related patent applications

This application is a continuation-in-part of our co-pending application, Serial No. 293,846, filed on June 16, 1952, and now abandoned, and our application, Serial No. 763,444, filed on July 24, 1947 and now abandoned. In these prior applications we described the methods of obtaining finely dvided solids by treating various inorganic colloidal solutions, such as solutions of sodium silicate, with coacervating agents and insolubilizing agents. The claims in application Serial No. 763,444 were eventually limited to the production of finely divided silica from colloidal silicate solutions by the use of acidic materials as insolubilizing agents, although the use of metal compounds capable of forming insoluble silicates was originally described and illustrated by several specific examples. This latter subject matter was included in application Serial No. 293,846 which has now been limited to the use of ammonia as a coacervating agent.

In our co-pending application, Serial No. 292,936, filed June 11, 1952, and now abandoned, and which is also a continuation-in-part of S.N. 763,444 we described more specifically how it is possible to obtain fine silica in particle sizes ranging down to about 7 millimicrons by the use of special mixing techniques and control of the conditions of the process. These mixing techniques and controls are also applicable to the production of the metal silicate products of the present invention and are required when the finest particle sizes are desired.

The invention broadly

The present invention relates to a novel method of forming finely divided particles of metal silicates which may also contain finely divided silica and metal oxide particles in addition to the metal silicate particles, the particle size of these products ranging from a few microns down to about 7 millimicrons. The method is generally applicable to the production of a wide range of finely divided metal silicates which are insoluble in aqueous solution. The method usually produces amorphous particles, the bulk of which are spherical and which are characterized by their unusual softness but in some cases crystalline particles are produced. The method broadly involves the reaction of certain sodium silicates, water miscible, hydrophilic, organic compounds (as coacervating agents) and specified insolubilizing agents. More particularly, our process comprises mixing an aqueous solution of sodium silicate having a weight percent ratio of $Na_2O$ to $SiO_2$ within the range of from about 2:1 to 1:4 and a concentration of $SiO_2$ ranging from about 1 to 30% by weight with a water miscible, hydrophilic, organic compound as a coacervating agent in a quantity and under conditions tending to produce a state of incipient coacervation at the moment of precipitation, the latter state being indicated by the first appearance of a faint opalescence in the final mixture, mixing in as an insolublizing agent a metal compound capable of forming an insoluble silicate in an amount sufficient to precipitate at least a substantial part of the silica in the mixture and recovering the finely divided precipitate thereby produced; the insolubilizing agent being mixed with the sodium silicate no earlier than the said organic coacervating agent is mixed therewith and under conditions maintaining the environmental conditions substantially uniform during the formation of a precipitate, whereby a substantially gel-free precipitate is obtained, as will be more fully set forth hereinafter.

The sodium silicate solution

According to the above method the sodium silicate solution should have a concentration of $SiO_2$ ranging from about 1 to 30% by weight and a weight percent ratio of $Na_2O$ to $SiO_2$ within the range of from about 2:1 to 1:4. The higher concentrations of $SiO_2$ are employed with the higher ratios of $Na_2O$ to $SiO_2$. For the production of particle sizes below about 20 millimicrons (mu) in diameter, the concentraitons of $SiO_2$ in the final mixture should be within the range of from about 3.5 to 10% by weight and the ratio of $Na_2O$ to $SiO_2$ in the silicate solution should be within the range of from about 1:2.4 and 1:4.

The organic coacervating agents

The coacervating agent must be a hydrophilic, organic material which is either water soluble or miscible with water. It is believed that coacervating agents having the above properties are capable of reducing the effective charge on the colloidal silica particles (micelles) present in the silicate solution and capable of desolvating these particles and/or reducing the effective dielectric constant of the medium between the particles. It must be an agent capable of coacervating silicate solutions when added thereto in sufficient quantity. The coacervating agent should not form a precipitate with water or at least it should not form a precipitate with water which is less soluble than the final precipitate produced in the process.

The coacervating agent should preferably be compatible with the metal compound insolubilizing agent; at least any reaction products formed by mixing the two must be more soluble than the final precipitate recovered in the process.

Among the organic coacervating agents which have been successfully used in our new process, there may be mentioned simple primary alcohols, diols, ketones, diketones and saturated cyclic ethers such as methyl and ethyl alcohols, acetone, ethylene glycol, the ethyl ether of ethylene glycol, isopropanol, dioxane and tetrahydrofurane. Among the various possible organic coacervating agents which can be employed in our process we consider methyl alcohol, acetone, isopropanol and Cellosolve (ethyl ether of ethylene glycol) to be somewhat preferable to the other reagents for economic reasons.

The quantity of organic reagent added is usually below that required to produce full coacervation of the solution and at a maximum is usually only sufficient to form what might be called protocoacervate, i.e. a solution in the state of incipient coacervation. If an excess above this maximum is added it is necessary by means of a special mixing technique to stop the action of the organic coacervating agent as described below before its full effect has been realized. The state of incipient coacervation is indicated by the appearance of the first faint opalescence in the solution. More sensitive criteria, such as dark field optical examination may be used. For the production of the finest particles this state should not be exceeded before the addition of an insolubilizing agent whose usual effect is to stop the coacervating action by insolubilizing the micelles present, although initially it may tend to promote the coacervating action by increasing the ionic strength of the solution.

The quantity of organic coacervating agent to be used in a given case can be estimated by a rather simple test. If the reagent is added slowly in measured quantities to the silicate solution with a sufficient time interval between additions to permit equilibrium conditions to be substantially reached between additions, a point will be found at which a faint opalescence will become visible. This quantity of organic coacervating agent can be called 100% for comparative purposes. We have found that it is usually possible to vary the quantity of the organic coacervating agent used in our process from a value of about 20% up to a maximum of 500% expressed in terms of this quantity required to produce the first appearance of opalescence when added under equilibrium conditions. When an excess, i.e. over 100%, is added the time of addition of the insolubilizing agent and the mixing conditions must be very carefully controlled. Rapid mixing must be used.

The particle size can be controlled by the amount of organic coacervating agent added. Other factors being equal the less the amount of organic coacervating agent employed the finer the particles in the resulting product. However, if too small an amount of coacervating agent is added, the resulting product will contain large amounts of gel while if too much is added, the particle size will be high. Of course, it will be obvious that mixtures of the organic reagents which act as coacervating agents can be used in amounts which may be determined as outlined above. Furthermore, it is obvious that added amounts of monomonovalent salts as described in our copending application can be used in combination with these organic reagents within the purview of this invention. Necessarily, some salt forms during the neutralization in any case and it can be expected that the organic reagent will appear to magnify the effect of a small amount of mono-monovalent or mono-divalent salt.

The insolubilizing agent

The insolubilizing metal compound must be soluble in water and as stated previously, it must form an insoluble silicate when mixed with silicate solutions. It is usually an electrolyte. It may be a salt, oxide or hydroxide of any metal from which insoluble silicates can be form in the wet way or whose metal ions precipitate insoluble metal silicates from aqueous silicate solutions.

At least 25 metals are known whose ions are capable of precipitating insoluble silicates from aqueous solution and any compound of these is operative which is more soluble in water than the corresponding metal silicate. A simple test for the operativeness of an insolubilizing agent with the organic coacervating agent and silicate solution is to mix the three simultaneously. If the precipitate is formed in the resulting mixture, the insolubilizing agent also will be found to produce a finely divided precipitate when added to a coacervate formed from the silicate solution and the organic coacervating agent.

Among the various possible insolubilizing agents which can be used in our process we consider the alkaline earth metal oxides and hydroxides, such as the oxides and hydroxides of calcium, magnesium, barium, and strontium to be of particular importance. Finely divided particles of calcium and magnesium silicates produced in this manner have special utility. Other insolubilizing agents which we have found advantageous in our process include oxides, hydroxides and salts of metals in groups $Ib$ to $VIII$ of the periodic table, which have solubility of at least $1 \times 10^{-5}$ g. in 1000 g. of water, such as $Al_2O_3$, $Fe_2O_3$, $HgO$, $SnO$, $ZnO$, $CoO$, $NiO$, $As_2O_3$; their salts such as $FeSO_4$, $Al_2(SO_4)_3$, $K_2TiF_6$, $NaAlO_2$, $ZnCl_2$, $CuCl_2$ and $Ti(SO_4)$. It is possible to employ as insolubilizing agents salts of amphoteric metals wherein the metal atoms occur in the anions, i.e. the alkali metal salts of amphoteric acids, with the resulting production of finely divided solid particles which consist of metal silicates. The particles produced are of uniform size and composition. Excess alkali should be avoided as this may destroy the colloidal nature of the silicate solution. In contrast, if salts of these same metals are employed, wherein the metal is in the cation, the precipitates usually are non-homogeneous mixtures of particles of metal silicate, $SiO_2$ and metal oxide which particles can be distinguished under a high power microscope. Thus, finely divided particles of metal silicates can be obtained in accordance with the present invention by mixing solutions of the alkali metal salts of bismuth, cerium, tantalum, titanium, arsenic, antimony, tin, platinum, gold, iron, tungsten, vanadium, molybdenum, columbium, aluminum, zinc, lead, chromium, and manganese with a protocoacervate of an alkali metal silicate solution. The alkali metal salt of the above amphoteric oxides used as insolubilizing agent in this procedure can usually be formed in situ, if desired. For example, if litharge is added to the protoacervate of an alkali metal silicate solution having a pH of at least about 11, the lead oxide will go into solution as sodium plumbate and this will cause a precipitate of finely divided particles of lead silicate. In the absence of the step of forming the protoacervate, the desired procedures normally produce a curdy or gelatinous precipitate of little or no utility.

The quantity of insolubilizing agent employed should be sufficient to precipitate at least a substantial portion of the silica present in the silicate solution; otherwise the process is not economical. A simple way to test whether sufficient insolubilizing agent has been added is to filter off the precipitate and then to add more insolubilizing agent to the filtrate. If a secondary precipitate is formed in the filtrate this shows that precipitation was originally incomplete. In some cases, of course, it may be advantageous to conduct our process by adding the precipitating agent step-wise and filtering off the precipitate after each addition. In this manner products having exceptionally fine particles of relatively uniform size can be obtained. But if one of our preferred mixing methods is employed, such products can be obtained rather easily in one step. An excess of insolubilizing agent over that required to precipitate all the silica from the mixture can be added if desired. The excess does no harm, it is merely wasted.

The insolubilizing agent can be added simultaneously with the organic coacervating agent either by the use of two separate streams or a pre-mixture of the organic coacervating agent and insolubilizing agent can be used. It is essential, of course, that the organic coacervating agent be mixed with the silicate solution not later than the insolubilizing agent is mixed therewith since, if the insolubilizing agent is mixed in first, no finely divided particles will be formed but instead there results a gelatinous or curdy mass.

It should be recognized that the metal silicates referred to are not normal stoichiometric compounds but rather non-crystalline amorphous precipitates in which the composition can be duplicated under identical conditions but if the conditions of precipitation are changed, as by changing the proportion of insolubilizing agent to silicate, the ratio of curdy to silicate may be changed.

Mixing of the reactants

In general the more efficient and the more rapid the mixing, the finer the particles produced. Several continuous mixing techniques are available wherein converging streams or jets of the reactants are employed followed by continuously filtering off of the precipitate formed. For example, the silicate solution can be continuously mixed in a Y tube with the organic coacervating agent and this mixture impelled in a jet to be mixed with a jet of the insolubilizing agent. It is also usually possible to mix the organic coacervating agent with the insolubilizing agent in a Y tube followed by mixing the resulting mixture in the form of a jet with a jet of the silicate solution. In this latter method it is evident that the organic coacervating agent and the insolubilizing agent are mixed with the silicate solution simultaneously and in a predetermined ratio. With the slowly reacting organic coacervating agent it is possible substantially to increase the proportion in the mixture since the insolubilizing agent effectively stops the coacervating action before it becomes more than partially effective. In the case of some reactants it is possible to use up to 500% of the quantity of coacervating agent capable of producing the first appearance of opalescence under equilibrium conditions. Substantially the same results are obtained if the reactants are mixed in three jets.

In all of the mixing techniques mentioned it is evident that during the formation of the ultimate particles the environmental conditions of concentration, temperature, pH and the like are maintained substantially constant so that there is essentially an equilibrium reaction. And, as mentioned previously, this is important in obtaining products of the finest particle sizes free from gel. In contrast, if mixing is accomplished by adding the organic coacervating agent to a beaker containing the silicate solution and the insolubilizing agent is then added slowly under agitating conditions over a period of say from 1 to 20 minutes, the resulting product will contain a substantial proportion of gel and the non-gel portion will consist of particles of widely different sizes. Under these conditions of mixing, it is evident that the environmental conditions of concentration, pH, temperature, etc. vary substantially from the beginning to the end of the mixing.

The mixing of streams or jets of the reactants in the ways described can, of course, be conducted on a commercial scale, the mixtures produced being passed to a continuous filter of a rotary drum type or being filtered in a moving filter belt, for example. The jet mixing techniques are capable of producing products whose average particle size is less than 20 mu down to a minimum of about 7 mu and containing less than 0.1% gel.

As described more completely in our co-pending application, S.N. 292,936, it is possible to obtain finely divided products having a particle size below 1 micron by mixing a coacervating agent with a silicate solution in a beaker, for example, and subsequently adding the insolubilizing agent while stirring. If this three-solution mixing technique is used, the insolubilizing agent is added rapidly and must be thoroughly mixed in before the appearance of substantially any irreversible precipitates in the mixture. Otherwise the product will contain considerable amounts of gel. Using this mixing technique, the maximum amount of organic coacervating agent which can be used may amount to about 150% while the minimum amount of this organic coacervating agent which can be used is roughly about 20–50% of that required to produce the first appearance of opalescence when added slowly under equilibrium conditions. In this case we are referring to the sodium silicate solution diluted to the final composition.

Reactant relationships

Certain rather well defined relationships have been established between the three elements involved in our new process, namely, the silicate solution, the organic reagent and the insolubilizing agent, and the manner in which these elements are mixed. For the production of the finest particle sizes we have found it essential to add the organic reagent and the insolubilizing agent to the sodium silicate solution in such fashion that insolubilization commences before coacervated particles become visible in the dark field microscope. Coacervation requires an appreciable time interval and hence it is possible to add an excess of the organic coacervating agent and then to mix in a solution of the metal compound quickly before the coacervating action has become fully effective. It is also possible and sometimes more convenient to add the organic coacervating agent in quantity short of that required, under equilibrium conditions, to produce incipient coacervation, after which the metal compound can be added immediately or after the lapse of a time interval.

Some coacervating agents act rapidly and some slowly. Using the organic coacervating agent, it is usually more convenient to add less than that required to produce the first appearance of opalescence but it is possible to use an excess of the organic reagent while adding the insolubilizing metal compound either simultaneously therewith or immediately thereafter and rapidly agitating the mixture to produce complete mixing within a period of less than 10 seconds. In this way, no substantial concentration or temperature changes take place during the actual formation of the insoluble particles. In other words the environmental conditions are maintained substantially constant during the formation of the ultimate particles. This we have found to be highly important in the formation of a product which is free from gel and of uniform particle size.

We have found a rather simple way of testing our finely divided products for the presence therein of gel material. This is done by subjecting the products to a 325 mesh wet screen test after grinding under standard conditions. Any residue left on the screen after the test can be considered gel. This is the same test which has been approved as standard for carbon black and it is known as ASTM Test D–185–45; see American Society for Testing Materials Standards for 1949; part 4, page 163. Products produced by the preferred method of the present invention pass this 325 mesh wet screen test leaving a residue on the screen of less than 0.5% and usually less than 0.1%.

Our invention can be described in greater detail by reference to the following specific examples which represent practical operating embodiments of our invention.

*Example 1.*—Fifty parts by volume of an aqueous solution of sodium silicate having a weight ratio of $Na_2O$ to $SiO_2$ of 1:2 and 6% of $Na_2O$ and 12% of $SiO_2$, was mixed with 6.6 parts by volume of acetone. The silicate solution had been filtered so as to make easier the detection of incipient coacervation. The acetone was added to the silicate with continuous, vigorous agitation. To this was added a solution of 25 parts by volume of 2 N $Al_2(SO_4)_3.18H_2O$ (alum) as an insolubilizing agent. The solution of the insolubilizing agent and the protocoacervate solution were poured simultaneously into a single container and agitated vigorously with a high speed mixer. The resulting slurry was then diluted with water and filtered and the precipitate was washed with 1500 parts by volume of distilled water. The precipitate was then dried under an infra-red lamp and the material ground. The product had the following approximate analysis:

| | Percent |
|---|---|
| Ignited loss | 30.17 |
| $SiO_2$ | 51.86 |
| $Al_2O_3$ | 11.53 |
| $Fe_2O_3$ | 0.017 |
| $TiO_2$ | 0.014 |

Sulfur as $-SO_3$, 0.48.

Particle size was determined by the usual P. and G. (Pechukas and Gage) method (described in I. and E. Chemistry, Analytical Edition, 18, 370, 1946) and the wet sieve residue of gel was determined as indicated above.

In this case the specific gravity of the product determined by the method of Snell and Biffen using xylene was found to be 2.045 and the particle size was 46 mu. By the wet sieve test, there was found to be 0.16% of gel present. However, when 37.5 parts by volume of the 2 N aluminum sulfate solution was used, the specific gravity of the product was 1.747 giving a particle size of 53 mu and there was only 0.07% of gel present.

In one further test 40 parts by volume of the same alum solution was used giving a specific gravity of 1.990 and a particle size of 53 mu. However, in this case the gel content was found to be 4.2%.

*Example 2.*—A similar test was carried out using the procedure described in Example 1. In this test 7.5 parts by volume of dioxane was found to form a protocoacervate with the same sodium silicate solution but in this case only 55 parts by volume of a solution containing 10% of $SiO_2$ was used. This protocoacervate was mixed as described above with 25 parts by volume of 2 N $FeCl_3.6H_2O$. The product had a specific gravity of 2.444 and the particle size was 36 mu. The wet sieve residue was 1.48%.

Similarly, when the protocoacervate was mixed with 25 parts by volume of 2 N $CdCl_2.2.5H_2O$ the product had a specific gravity of 2.982 and the particle size was 52 mu. By the wet sieve test there was no screen residue.

*Example 3.*—This example was carried out by the same technique as in Example 1 but using a sodium silicate having a ratio of $Na_2O:SiO_2$ of 1:2.40, and $Na_2O$ equal to 13.8%. It was diluted to 10% $SiO_2$. A protocoacervate was formed with 50 parts by volume of this diluted sodium silicate and 7 parts by volume of dioxane. This protocoacervate was mixed as before using 25 parts by volume of 2 N $Mg(NO_3)_2.6H_2O$. The product when filtered, washed and dried as before had a specific gravity of 2.223 and a particle size of 44 mu. The wet screen residue was 0.31%.

When this same protocoacervate was mixed with 25 parts by volume of 2 N $FeCl_3.6H_2O$ the product had a specific gravity of 2.351 and a particle size of 30 mu. The screen residue was 2.7%. The higher screen residues with $FeCl_3$ are caused by $Fe(OH)_3$ gel agglomerated with fine pigment silica.

*Example 4.*—Again using the procedures as in Example 1 and a sodium silicate having a ratio of $1Na_2O:3.75SiO_2$ diluted to 10% $SiO_2$, a protocoacervate was formed with 5 parts by volume of dioxane and 50 parts by volume of the dilute sodium silicate. This protocoacervate was mixed with rapid agitation and simultaneous pouring as above with 25 parts by volume of 2 N $Ca(NO_3)_2.4H_2O$. The product had a specific gravity of 2.132, particle size of 33 mu and no screen residue.

*Example 5.*—The same diluted silicate solution as in Example 4 formed a protocoacervate with 4.3 parts by volume of Cellosolve (the trademark of Union Carbide and Chemical Company for the ethyl ether of ethylene glycol). This protocoacervate was mixed as in Example 1 with 25 parts by volume of 2 N $Mg(NO_3)_2.6H_2O$. This had a specific gravity of 2.114 and a particle size of 31 mu. There was no wet screen residue in this case.

*Example 6.*—To 1000 pounds of a solution of sodium silicate containing 8.6% $SiO_2$ and a weight ratio of 3.2 $SiO_2$ to $1Na_2O$ was added 7% of methanol, sufficient to form a protocoacervate. This was insolubilized with a slurry containing 77.8 pounds of CaO which produced almost immediate insolubilization. The product as washed and dried was about 0.5 micron average size. The particle size appeared to vary from about 0.1 to 2 microns.

*Example 7.*—50 parts by volume of a 30% aqueous solution of the same silicate as that used in the preceding example was mixed with 15 parts of methyl alcohol to form a protocoacervate. This was then mixed with 50 parts of GRS latex (type 3, total solids 31.12%, made by the Naugatuck Chemical Company). The silica was insolubilized as in the previous examples with a solution of calcium chloride containing 40% by weight of $CaCl_2$. The finely divided calcium silicate was intimately mixed with the rubber fibers.

*Example 8.*—50 parts by volume of an aqueous solution containing 25% of "K" silicate (containing 11% $Na_2O$ and a ratio of $1Na_2O:2.84SiO_2$ sold by the Philadelphia Quartz Company) was mixed with 4 parts by volume of ethanol. The 25% solution of "K" silicate contained about 8% of $SiO_2$. Three parts by weight of silk fabric was dipped into the protocoacervate mixture formed by this combination and insolubilization was obtained by the addition of a quantity of lead chloride equivalent to the $SiO_2$. The silk fabric was found to be weighted with a lead silicate product uniformly deposited in and on the fibers.

The products of this invention are useful in a large number of industrial applications, in fact they are useful wherever finely divided products can be used. These products have a particle size varying approximately from a few microns down to about 7 millimicrons, the particle size being extremely uniform in a given product.

Probably the most universal use for these products is as fillers for plastics and resins of all types and extenders for fertilizers, insecticides, etc. The products which are colored can be used as pigments in paints, inks, etc. Several of our products are adapted to fine polishing procedures by reason of their fineness, softness and spherical shape. The arsenic silicate products can be used as insecticides. The zinc, magnesium, barium calcium and lead silicate products can be used as reinforcing agents in the compounding of rubber. Our products can be produced at a cost which is usually considerably below that of other processes now used for producing products of a comparable particle size. In addition our products have the advantage that they are more dense than the absorbent gels of the prior art and can be readily washed free from extraneous matter owing to their excellent filtering properties. They can be obtained in a highly pure condition. For this reason they can be used as excipients in pharmaceutical preparations and the like. Many other uses for these products will occur to those skilled in the art.

Our process lends itself to the production of filled products of various types. Water soluble resins, for example, can be filled by forming one of our protocoacervates in the presence of a dissolved resin followed by precipitating the resin and the finely divided silicate compound simultaneously by mixing in a mutual insolubilizing compound. Thus sodium rosinate can be dissolved in sodium silicate, an organic coacervating agent added and co-precipitation produced with an acid-reacting metal salt solution. Polyvinyl alcohol resins can also be filled in this manner. If one of our precipitates is formed in the presence of a finely divided material, such as paper pulp, asbestos fibers or other fibrous material in suspension, the finely divided precipitate is formed in and on the fibers and the latter become thoroughly impregnated.

While we have described what we consider to be the most advantageous embodiments of our process it is evident, of course, that various modifications can be made in the specific procedures which have been described without departing from the purview of this invention. It is believed obvious from the above description that our process is capable of producing colloidal-sized particles of a large number of metal silicates which may contain metal oxide and/or silica in addition to the metal silicate. Owing to the large number of possible compounds involved and of the many modifications of procedure which may be followed, it is impossible to set out any specific range of concentrations, temperatures and the like which are applicable to all cases. Neither is it possible to set out a single specific procedure which would be applicable to the preparation of all of the various possible finely divided products. However, we believe that the foregoing specific examples, coupled with the description of the general principles involved in our invention, will enable those skilled in the art to produce the finely divided products falling within the scope of this invention. A large number of mixing procedures are available which conform to the principles set out. As pointed out previously, in general the more rapid the mixing the more finely divided the products produced. Mixing can be accomplished in conventional mixing tanks by introducing the reactants simultaneously through two or more pipes, if desired, in order to maintain the environmental conditions relatively constant during formation of the precipitate. It is possible to substitute solutions of other alkali metal silicates, such as potassium silicate, for the sodium silicate solutions used in the described processes. Conventional ways of separating the precipitate can be used but it is usually advisable to separate the product promptly after it is formed since there may be a tendency for the particles to agglomerate if they are kept in suspension too long. Further modifications of our process which fall within the scope of the following claims will be immediately evident to those skilled in this art.

In the foregoing specification, percentages are by weight unless otherwise specified.

The Snell and Biffen method of determining specific gravity is found in "Commercial Methods of Analysis," Snell and Biffen, page 49.

What is claimed is:

1. In the manufacture of finely divided metal silicate products, the process which consists essentially in (a) preparing an aqueous solution of sodium silicate having a weight percent ratio of $Na_2O$ to $SiO_2$ within the range of from about 2:1 to 1:4 and a concentration of $SiO_2$ ranging from about 1 to 30 percent by weight;

(b) mixing said aqueous solution with a water miscible organic agent capable of coacervating silicate solutions in a quantity and under conditions tending to produce a state of incipient coacervation but without the formation of an insoluble precipitate, the incipient coacervation being indicated by the first appearance of a faint opalescence in the mixture;

(c) more than incipient coacervation being prevented by mixing in an aqueous solution of an insolubilizing agent comprising a metal compound which forms an insoluble silicate before the appearance of more than a faint opalescence in the mixture, and completing the mixing in of said insolubilizing agent before precipitation occurs;

(d) the quantity of said insolubilizing agent employed being sufficient to convert at least a substantial proportion of the sodium silicate into an insoluble precipitate, and said insolubilizing agent being mixed with the sodium silicate solution no earlier than the organic coacervating agent is mixed therewith;

(e) maintaining the environmental conditions of concentration, temperature and pH substantially constant during the entire period of formation of the insoluble precipitate by completing the mixing in of the insolubilizing agent within a period not substantially exceeding 10 seconds, and (f) recovering the resulting finely-divided substantially gel-free precipitate.

2. The process according to claim 1 wherein the organic coacervating agent and insolubilizing agent are added simultaneously to the silicate solution and the organic coacervating agent being in a quantity amounting to from about 100 to 500% of that which is required, when added sufficiently slowly to permit equilibrium conditions substantially to be established, to produce the first appearance of a faint opalescence in the mixture.

3. The process of claim 1 wherein jet-mixing is employed and a jet of the insolubilizing agent is mixed with jets of the sodium silicate solution and of the organic coacervating agent.

4. The process of claim 1 wherein the mixing is conducted by mingling streams of the sodium silicate solution, organic coacervating agent and insolubilizing agent and the finely divided product is continuously filtered from the resulting mixture.

5. The process of claim 1 wherein a finely divided material is present in the final mixture during the formation of the precipitate, whereby the said material becomes impregnated with the finely divided metal silicate product formed in the process.

6. The process of claim 1 wherein rubber latex is present in the mixture during the formation of the precipitate and the insolubilizing agent is one capable of coagulating the latex, whereby a rubber crumb is recovered impregnated with the finely divided metal silicate formed in the process.

7. The process of claim 1 wherein the concentrations of the reactants are adjusted so that the $SiO_2$ concentration in the final mixture is from 0.5 to 8% by weight and wherein the ratio of $Na_2O$ to $SiO_2$ is from 1:2.4 to 1:4.

8. The process according to claim 1 wherein the insolubilizing agent is calcium chloride.

9. The process according to claim 1 wherein the insolubilizing agent is an alkaline earth metal salt.

References Cited in the file of this patent

UNITED STATES PATENTS

| | | |
|---|---|---|
| 2,485,287 | Henson et al. | Oct. 18, 1949 |
| 2,598,353 | Bierce | Feb. 21, 1950 |

FOREIGN PATENTS

| | | |
|---|---|---|
| 352,681 | Great Britain | July 16, 1931 |

OTHER REFERENCES

Mellor: "A Comprehensive Treatise on Inorganic and Theoretical Chemistry," vol. 6, pp. 323 and 324, Longmans, Green and Co., London, 1925.

UNITED STATES PATENT OFFICE
CERTIFICATE OF CORRECTION

Patent No. 2,948,701            August 9, 1960

Chester L. Baker et al.

It is hereby certified that error appears in the printed specification of the above numbered patent requiring correction and that the said Letters Patent should read as corrected below.

Column 4, line 3, for "form" read -- formed --; line 27, for "1000 g." read -- 100 g. --; column 5, line 20, for "curdy" read -- cation --; column 7, line 18, in the table, for "Sulfur as ⁻SO₃, 0.48." read -- Sulfur (as SO₃)------------0.48 --; column 7, line 64, for "higher" read -- larger --; column 8, line 52, after "barium" insert a comma; column 9, line 18, for "range" read -- ranges --; column 10, line 60, list of references cited, for the patent number "2,598,353" read -- 2,498,353 --.

Signed and sealed this 25th day of April 1961.

(SEAL)
Attest:

ERNEST W. SWIDER
Attesting Officer

DAVID L. LADD
Commissioner of Patents